Patented Sept. 24, 1940

2,215,600

UNITED STATES PATENT OFFICE 2,215,600

ARTIFICIALLY COLORED GRANULES AND METHOD OF PRODUCING SAME

Marion H. Veazey, Rutherford, N. J., assignor to The Patent and Licensing Corporation, New York, N. Y., a corporation of Massachusetts No Drawing. Application March 7, 1935, Serial No. 9,786

9 Claims. (Cl. 91—70)

This invention concerns improvements in the production of artificially colored granules and more particularly artificially colored granules to be used as a surfacing for materials subject to exposure to the weather, as for example mineral surfaced roofing, siding or the like.

Processes have heretofore been in use for the artificial coloring of granules to be used as a surfacing for asphalt coated roofing in order to obtain colorings which are not available in the natural sources of supply of the mineral base, as for example crushed slate, etc.

Chief among the processes that have heretofore been proposed is one wherein the pigment or coloring agent is affixed to the surfaces of the granules by means of soluble silicate and particularly sodium silicate. It becomes necessary therefore in these processes to insolubilize the silicate in order that the coating of artificial coloring may be made permanently weather resisting, or "tight" as it is sometimes referred to. It has therefore heretofore been proposed to heat the coated granules in retorting apparatus at temperatures sufficiently high to effect insolubilization of the coating, the temperatures required for this purpose varying from 900° to 1500° F. depending upon the conditions of the operation. It has likewise been proposed to effect insolubilization of the silicate coating by chemical action under conditions which would avoid the necessity of retorting the granules at such high temperatures, thus reducing the cost of the equipment necessary and also the fuel cost and at the same time making it possible to employ pigments which are harmfully affected when the high retorting temperatures are employed. This chemical method of insolubilization has been utilized by taking advantage of certain classes or types of base granules which are, or which carry constituents that are reactive toward soluble silicate, permitting the insolubilization to take place at temperatures of from 250 to 650° F. In other instances this method of insolubilization, where the base granule is not itself reactive toward soluble silicate, has been carried out by incorporating in the mixture of the sodium silicate and the pigment with which the granules are coated, a re-agent, such as certain compounds which under the conditions of operation will react with the soluble silicate and permit insolubilization to take place at comparatively lower temperatures.

It has been observed however, for a considerable period of time that while the coloring of granules coated by these processes wherein sodium silicate is utilized as the binding agent, may be made adequately weather resistant by the schemes for insolubilizing the silicate above referred to if carried on under appropriate operating conditions, nevertheless there is another phase to this problem which has presented serious difficulty and a perplexing problem. I have reference to the phenomenon which is referred to in this connection as "blooming". This "blooming" manifests itself in the form of a white or opaque and more or less bulky deposit on the granules, when the finished granules made by the processes above described are moistened with water and the water subsequently evaporated.

In my earlier co-pending application Ser. No. 737,774, filed July 31, 1934, I have described in detail this "blooming" effect, and the apparent mechanism by which it occurs, I have therein described and claimed certain methods whereby to eliminate this blooming tendency in granules artificially colored by the processes wherein use is made of soluble silicate such as sodium silicate as the binding or fixing agent. As stated in my said co-pending application, it appears that this "blooming" effect is due to the presence of sodium carbonate in the film of the coating material. This sodium carbonate apparently results chiefly from the reaction between the hydroxide present in the sodium silicate used in the coloring process and carbon dioxide present in the flue gases with which the granules are heated in order to bring the colored coating to the insolubilized state. Some of this "blooming" effect is apparently due also to the presence in the film of certain amounts of sodium hydroxide (free alkali contained in the sodium silicate) which, when leached out on contact with moisture, slowly reacts with the carbon dioxide of the air to form sodium carbonate.

In my said earlier application I disclosed methods for overcoming this blooming effect, according to which the absorption of carbon dioxide by the alkali contained in the film of silicate during the passage of the coated granules through the retort or kiln, may be prevented. Also, I disclosed therein certain separate steps of treating the granules, after they have been retorted, with material which would remove from the film of the finished granules such sodium carbonate and sodium hydroxide as might be present therein and give rise to the "blooming" effect.

My present invention has for its object the production of artificially colored granules, utilizing sodium silicate as the fixing or binding agent for the pigment, in which the normal tendency of such granules to exhibit the "blooming" effect in service is eliminated by methods simpler and more expeditious than those set forth in my said co-pending application, with the production of granules which will not only be non-blooming but also have a tight and weather resisting coloring film.

My present invention and the means by which the objects thereof are accomplished are based upon the reaction of sodium silicate with materials which produce reaction products all of which are substantially insoluble in water. The reacting materials which I employ in accordance with my present invention for reaction with the soluble silicate also reacts with the alkali which may be present in the sodium silicate, so that the resulting granules are neutral. This neutralization of the alkali therefore avoids the possibility of absorption of carbon dioxide by the alkali to produce sodium carbonate, which is the material that really causes the blooming, as explained in my aforesaid co-pending application. The silicate is insolubilized with the production of reaction products that are substantially insoluble in water. At the same time, the insolubilization of the silicate may be effected at low temperatures varying from room temperature to 650° F., thus retaining all of the above stated advantages of low temperature operations when compared with operating at high temperatures.

The reagents used in accordance with my present invention, as will presently be described in greater detail, should possess the following chief characteristics or properties:

1. It must be one which is capable of producing insolubilization of the silicate at relatively low temperatures;

2. It must react with the alkali present in the film so that the resulting granules are neutral; and 3. It must be capable of producing reaction products with the soluble silicate, all of which are substantially water-insoluble.

The importance of utilizing reagents to effect insolubilization with the production of reaction products that are insoluble in water or substantially so resides in the fact that many water soluble or partly water soluble salts may themselves be of bloom forming character, as distinguished from sodium carbonate which, as explained in my aforesaid application, gives rise to a "bloom" by becoming converted under conditions that the granules meet in service, into a hydrated salt that forms a bloom.

I have found that certain types of fluosilicates which are normally only slightly soluble in water, such as barium fluosilicate, react with sodium silicate in such a way that the reaction products are practically insoluble in water. Commercial barium fluosilicate is acid, imparting a pH of somewhere between 3.0 and 5.0 to water in which it is immersed and its solubility varies from 0.02 to 0.09 gram per 100 cc. of water depending upon the temperature. The reaction between barium fluosilicate and sodium silicate takes place at normal temperature in a relatively short period of time and the rate of reaction can be controlled to a certain extent by the amount of water present.

The reaction may be represented by the following equation:

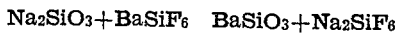

In the above equation the barium silicate which is one of the products of the reaction is insoluble in water, while the sodium fluosilicate which is the other product of the reaction, is soluble in water to only a slight extent, namely 0.65 gram per 100 cc. at 17½° C.

In actual practice of the process utilizing barium fluosilicate as the reagent in accordance with the above equation, it is found that much less than metathetical proportions of the barium fluosilicate are required because the greater portion of the sodium silicate is insolubilized by the dehydrating action under the conditions of operation and it is necessary therefore that the barium fluosilicate shall react only with the soluble portion of the sodium silicate, namely that portion which is not insolubilized in drying.

In the practice of my invention the granules may first be mixed with the required amount of sodium silicate and the desired pigments or with a suspension of the pigment in the silicate. After being mixed, the barium fluosilicate is added in the form of a finely divided powder or as a paste with the least possible amount of water, the mixing being continued for a little time longer. The order of mixing however is not critical and in certain instances it may be preferable to mix the dry granules with the pigments and the barium fluosilicate followed by adding the required amount of sodium silicate and continuing the mixing for a few more minutes. In either event, however, an excess of water should be avoided as such excess appears to impair the color of the finished granules in certain instances and also requires larger quantities of the barium fluosilicate. This reagent, being a rather expensive one, should of course be employed in the minimum quantities necessary to produce the desired results. The larger quantities necessary to produce these results when an excess of water is present during the mixing is apparently due to the fact that with such excess of water a greater amount of the barium fluosilicate in solution is consumed in reacting with the soluble portion of the sodium silicate. This, as above stated, is not necessary where heat is also employed because the action of the heat insolubilizes the greater part of the sodium silicate and it is necessary therefore only to use such an amount of the barium fluosilicate as will react with the remainder of the sodium silicate and with any sodium hydroxide and sodium carbonate that may be present. The use of the barium fluosilicate in the process herein described accordingly may be more or less interchangeable in respect to the quantities employed, with the degree of heat employed in treating the coated granules. This will more fully appear from the specific examples given hereinbelow.

By this treatment I have found it is possible to obtain artificially colored granules utilizing sodium silicate as the binder, the coloring film being permanently weather resistant and free from any constituents such as sodium carbonate or materials which tend to form sodium carbonate and give rise to the "blooming" phenomenon above referred to. As already explained, the reaction is also of such character as to make it possible in fact to artificially color the granules with air drying of the coating and thus avoid the retorting of the granules, although the expense of the heat employed in retorting may be balanced against the amount of barium fluosilicate employed.

As one specific example illustrating the invention I have been able to produce an artificially colored granule utilizing Pennsylvania glass sand as the base granule. 400 parts by weight of these granules were mixed with four parts of lead chromate for the production of a yellow granule and with 5⅓ parts of barium fluosilicate and 24 parts of sodium silicate, 4 parts of water being included in the mix to provide proper workability.

The sodium silicate employed was a commercial grade known as "N" brand, in which the weight ratio of $Na_2O$ to $SiO_2$ is 1:3.25 and containing 62% of water. The granules as thus coated after being air dried for 48 hours at room temperature showed, when subjected to the usual wash tests, a satisfactory tightness, there being only a slight or negligible loss and the film of the pigmented reaction product being firmly adherent to the base granules. Specifically, five successive washings of a 25 gram sample of the dried granules with hot water showed a loss of only 0.003 gram. Also, extraction of the granules with cold water showed the presence of only very low amounts of hydroxide or carbonate, the values obtained by titration of the water extract with phenolphthalein indicating quite conclusively that the amount of "bloom" from these granules would be entirely negligible. Also, separate "blooming" tests as described in my aforesaid application showed that the granules thus produced would show substantially no "blooming" in service.

As another illustration of the invention and one which also illustrates the interchangeability between the amount of barium fluosilicate employed and the temperatures at which the granules are dried is as follows:

400 parts by weight of trap rock granules were mixed with 4 parts by weight of chromic oxide ($Cr_2O_3$) for the production of a green granule, and with 24 parts of sodium silicate, 4 parts of water, and with 2⅔ parts of barium fluosilicate. The thus coated granules were dried in a kiln at temperatures between 550 and 600° F. and the finished granules likewise showed satisfactory tightness and also no indication of any tendency to "bloom". Specifically, the washing of 25 gram samples of the finished granules five successive times with hot water showed a loss of only 0.010 gram insoluble matter. Cold extraction tests, i. e., when 50 grams of the finished granules were extracted with cold water showed complete neutrality upon titration with phenolphthalein, thus indicating that there was neither sodium carbonate nor sodium hydroxide present on the granules and that therefore the finished granules would exhibit no tendency to "bloom." This was confirmed by separate blooming tests.

Comparing the foregoing specific example with the one first above given it will be noted that in the one case the requisite tightness of the film and its freedom from blooming is obtained by air drying the coated granules utilizing 5⅓ parts by weight of barium fluosilicate with 24 parts of sodium silicate to treat 400 parts of granules; whereas in the other case, utilizing heat of the order of 550 to 600° F. substantially the same results are obtained with only 2⅔ parts by weight of barium fluosilicate for treating the same amount of granules with the same amount of sodium silicate.

While I have hereinabove explained what I believe to be the theory underlying the results obtained by my invention and have depicted the same by chemical equations, it is to be understood that I do not wish to be confined to such theory as it is quite possible that the reaction or reactions which occur in carrying out the invention may be much more complex than that stated. The fact remains however that the results herein stated are obtainable by carrying out the invention in the manner described.

In lieu of barium fluosilicate as the reagent in the process according to the present invention there may be employed the commercial form of sodium fluosilicate. This commercial form of sodium fluosilicate is slightly soluble and has an acid reaction in solution.

I claim:
1. The method of artificially coloring granules which comprises coating the granules with a mixture of pigment, soluble silicate, and a slightly soluble fluosilicate adapted to react with the silicate with neutralization of the alkali, and then drying the granules, the proportions of said fluosilicate in relation to the soluble silicate being sufficient to produce granules substantially devoid of free alkali and of water-soluble salts.

2. The method of artificially coloring granules which comprises coating the granules with a mixture of pigment, sodium silicate, and barium fluosilicate and drying the granules at the temperatures below 650° F.

3. The method of artificially coloring granules which comprises coating the granules with a mixture of pigment, sodium silicate, and barium fluosilicate, and then drying the granules at temperatures below 650° F., the proportion of barium fluosilicate in relation to the sodium silicate being such as to produce granules which are of neutral reaction and free of salts of appreciable water-solubility.

4. The method of coloring granular material, comprising spreading coloring agent, barium fluosilicate and an aqueous dispersion of alkali-metal silicate over the surfaces of the granular material and drying the coated granules.

5. The method of coloring granular material comprising spreading coloring agent, sodium fluosilicate and an aqueous dispersion of alkali-metal silicate over the surfaces of the granular material and drying the coated granules.

6. Roofing granules which consist of granular mineral nuclei individually carrying upon substantially all their surfaces a coating of the low temperature reaction products of barium fluosilicate, alkali-metal silicate in an aqueous dispersion, and a coloring agent.

7. Roofing sheets surfaced with the article of claim 6.

8. As a new article of manufacture, roofing granules of the class described having on the exterior thereof a substantially non-blooming, insoluble coating, said coating consisting substantially of the reaction product of sodium fluosilicate and sodium silicate, and being substantially free from water-soluble salts of sodium.

9. As a new article of manufacture, roofing granules of the class described having on the exterior thereof a substantially non-blooming, insoluble coating, said coating consisting substantially of pigment and the reaction product of sodium fluosilicate and sodium silicate, and being substantially free from water-soluble salts of sodium.

MARION H. VEAZEY.